US008543100B2

(12) United States Patent
Cheng et al.

(10) Patent No.: US 8,543,100 B2
(45) Date of Patent: Sep. 24, 2013

(54) METHOD OF MANAGING MOBILITY MANAGEMENT LAYER OF A MOBILE DEVICE

(75) Inventors: Tsung-Yo Cheng, New Taipei (TW); Mei-Yi Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 13/409,022

(22) Filed: Feb. 29, 2012

(65) Prior Publication Data

US 2013/0090104 A1 Apr. 11, 2013

(30) Foreign Application Priority Data

Oct. 7, 2011 (TW) .............................. 00136582 A

(51) Int. Cl.
*H04M 3/00* (2006.01)
(52) U.S. Cl.
USPC ........... 455/418; 455/445; 455/450; 455/436; 455/414.3; 455/414.13; 455/414.1; 370/329; 370/338; 370/312; 370/229; 370/345
(58) Field of Classification Search
USPC ........... 455/445, 450, 418, 436, 414.3, 414.1; 370/329, 338, 312, 229, 331, 345
See application file for complete search history.

(56) References Cited

U.S. PATENT DOCUMENTS

| 6,259,925 | B1 | 7/2001 | Josse | |
|---|---|---|---|---|
| 2006/0013176 | A1* | 1/2006 | De Vos et al. | 370/338 |
| 2007/0270152 | A1* | 11/2007 | Nylander et al. | 455/445 |
| 2010/0061295 | A1 | 3/2010 | Preteseille | |
| 2010/0322128 | A1* | 12/2010 | Becker et al. | 370/312 |
| 2011/0026484 | A1* | 2/2011 | Fox et al. | 370/331 |
| 2011/0261777 | A1* | 10/2011 | Maeda et al. | 370/329 |
| 2012/0008573 | A1* | 1/2012 | Shiva et al. | 370/329 |
| 2012/0014332 | A1* | 1/2012 | Smith et al. | 370/329 |
| 2012/0089742 | A1* | 4/2012 | Jagannatharao et al. | 709/229 |

FOREIGN PATENT DOCUMENTS

| GB | 2 367 207 A | 3/2002 |
|---|---|---|
| WO | WO 2008/038171 A1 * | 3/2008 |

OTHER PUBLICATIONS

3rd Generation Partnership Project; Technical Specification Group Core Network and Terminals; Mobile radio interface Layer 3 specification; Core network protocols; Stage 3 (Release 10), 3GPP TS 24.008 V10.3.0, Jun. 15, 2011, cover page and pp. 49-52, 78-79, 98, 114, 563-565, XP-002687235.
ACER, Timer of mobility management in MM state 9, 3GPP TSG-RAN2 Meeting #75 bis, R2-114880, Oct. 10-14, 2011, XP050540544, Zhuhai, China.
Acer Incorporated, Timer of mobility management in MM state 9, 3GPP TSG CT WG1 Meeting #77, C1-120995, Apr. 16-20, 2012, XP050587295, Taipei, Taiwan.

* cited by examiner

*Primary Examiner* — Joseph Arevalo
(74) *Attorney, Agent, or Firm* — Winston Hsu; Scott Margo

(57) ABSTRACT

After a mobility layer of a mobile device enters a waiting state, a timer is activated. The mobile device is configured to await further instructions from a network system before the timer expires and control the mobility layer to leave the waiting state if the timer expires, thereby improving system efficiency.

5 Claims, 2 Drawing Sheets

METHOD OF MANAGING MOBILITY MANAGEMENT LAYER OF A MOBILE DEVICE

BACKGROUND OF THE INVENTION

1. Field of the Invention

The present invention is related to a method of managing a mobility management layer in a mobile device, and more particularly, to a method of managing a mobility management layer in a mobile device with improved system efficiency.

2. Description of the Prior Art

According to 3GPP (3rd Generation Partnership Project) mobile communication structure, the wireless interface protocol structure of a mobile device includes three layers: a physical layer, a data link layer, and a network layer. The data link layer includes a packet data convergence protocol (PDCP) layer, a radio link control (RLC) layer, and a medium access control (MAC) layer. The network layer includes a radio resource control (RRC) layer, a mobility management (MM) layer and a connection management (CM) layer.

The RLC layer is configured to provide services including protocol data unit (PDU) transmission, automatic retransmission request (ARQ) correction, concatenation, service data unit (SDU) segmentation/reassembly/deletion, sequential PDU transmission, duplicative detection, protocol error detection, and protocol reestablishment.

The MAC layer is configured to provide services including hybrid automatic repeat request (HARQ) error correction and transmission time interval (TTI) bundling transmission.

The CM layer is configured to provide call controls, including establishing connection, selecting connection type (voice or fax) and releasing connection, and manage supplementary service (SS) and short message service (SMS).

The RRC layer is configured to maintain connection, establish/release communication channel, and manage power control.

The MM layer is configured to handle user verification, signal encoding and all mobility-related functions so that the network may be informed of the current location of the mobile device.

According to current 3GPP specifications, after entering State 9, the MM layer has a RR connection to its peer entity in the network, but no MM connection is established. The mobile device is passive, awaiting further commands from the network. In the prior art, if the network somehow fails to respond, the MM layer of the mobile device may stay in State 9 and thus is unable to provide other services.

SUMMARY OF THE INVENTION

The present invention provides a method of managing a mobility management layer in a mobile device. The method includes acquiring a waiting period after the mobility management layer enters awaiting state; the mobility management layer exiting the waiting state according to a command received from a network if the waiting period does not exceed a predetermined value; and the mobility management layer exiting the waiting state if the waiting period exceeds the predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
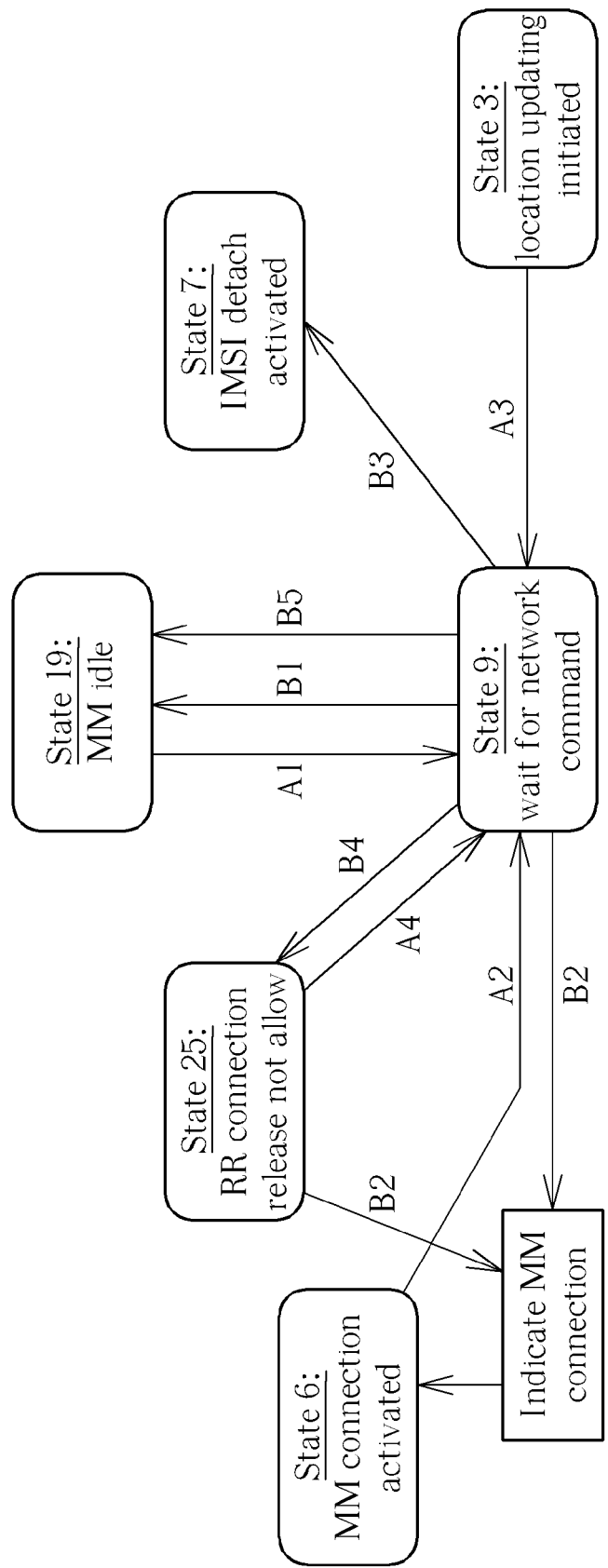
FIG. 1 is a state diagram illustrating the operation of the MM layer in a mobile device according to the present invention.

FIG. 1 is a state diagram illustrating the operation of the MM layer in a mobile device according to the present invention. FIG. 1 depicts state 3 "location updating initiated", state 6 "MM connection activated", state 7 "IMSI (international mobile subscriber identity) detach activated, state 9 "wait for network command", state 19 "MM idle", and state 25 "RR connection release not allow". Since the present invention is related to the operation of state 9, only relevant states are depicted in FIG. 1. Other possible states of the MM layer are described and explained in related 3GPP specifications (such as 24.008 rel-11.2).

Figure 2:
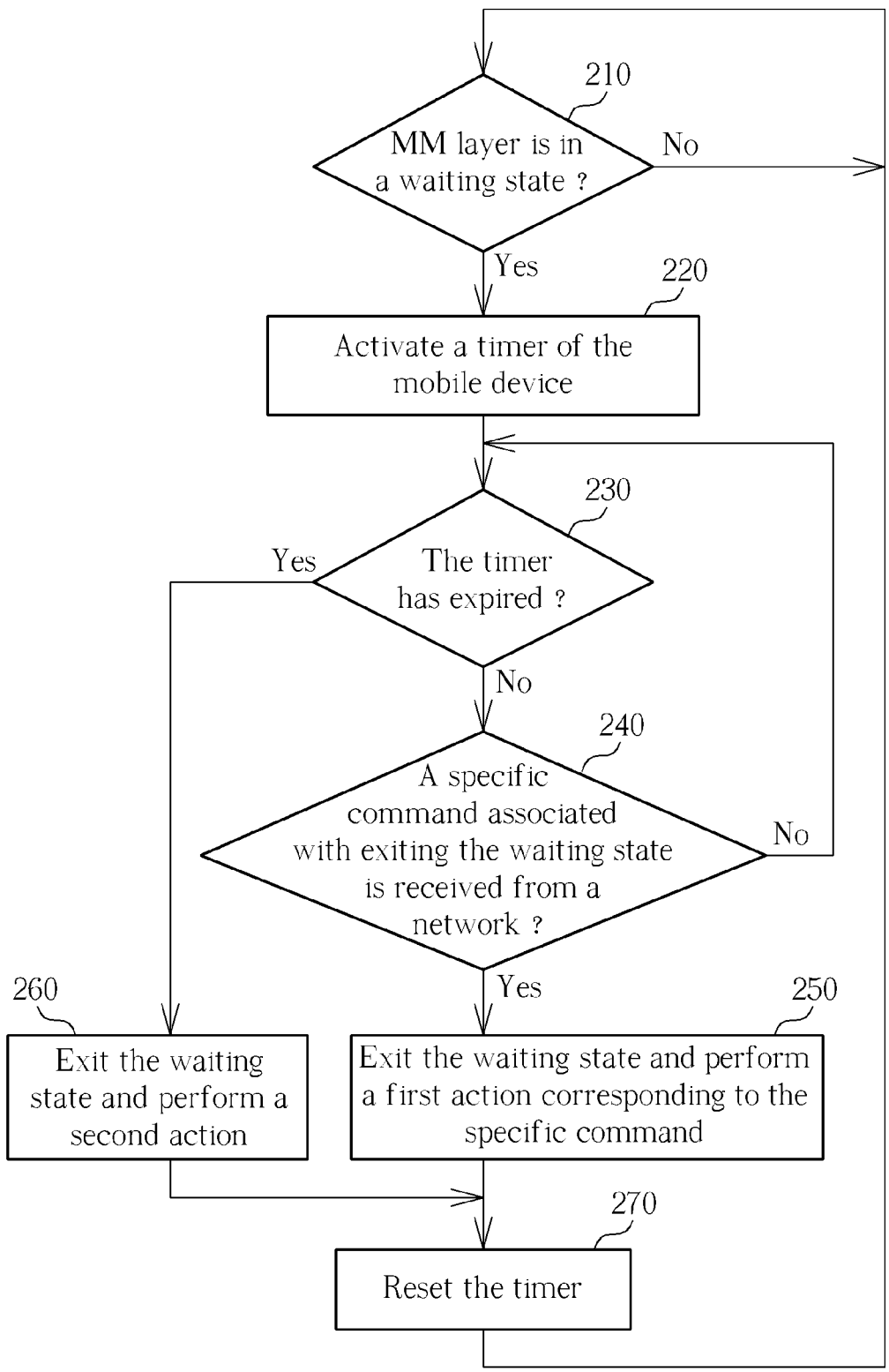
FIG. 2 is a flowchart illustrating a method of operating the MM layer in a mobile device according to the present invention.

FIG. 2 is a flowchart illustrating a method of operating the MM layer in a mobile device according to the present invention. The method includes the following steps:

Step 210: determine whether the MM layer is in a waiting state: if yes, execute step 220; if no execute step 210.

Step 220: activate a timer of the mobile device, execute step 230.

Step 230: determine whether the timer has expired: if yes, execute step 260; if no execute step 240.

Step 240: determine whether a specific command associated with exiting the waiting state is received from a network: if yes, execute step 250; if no execute step 230.

Step 250: exit the waiting state and perform a first action corresponding to the specific command, execute step 270.

Step 260: exit the waiting state and perform a second action, execute step 270.

Step 270: reset the timer, execute step 210.

In step 210, the waiting state may be state 9 defined in 3GPP specifications (such as 24.008 rel-11.2). In state 9, the MM layer has a RR connection to its peer entity in the network, but no MM connection is established. The mobile device is passive, awaiting further commands from the network. In the embodiment illustrated in FIG. 1, the MM layer may enter state 9 after the mobile device performs actions A1-A4. Action A1 is "RR connection established" in response to paging. Action A2 is "last connection release". Action A3 is "store system info". Action A4 is "RR connection release not allowed". If it is determined in step 210 that the MM layer has entered the waiting state (such as state 9), step 220 is executed for activating the timer of the mobile device, and step 230 is then executed for determining whether the timer has expired.

If it is determined in step 230 that the timer has not expired, step 240 is executed for determining whether the specific command associated with exiting the waiting state is received from the network. When receiving the specific command, step 250 is executed for exiting the waiting state and performing the first action corresponding to the specific command. In the embodiment illustrated in FIG. 1, the first action may be actions B1-B4. Action B1 is "RR connection release" according to a network command. Action B2 is "indicate MM connection" after receiving a first message. Action B3 is "MS (mobile station) deactivated and attach allowed". Action B4 is "RR connection release not allow".

If it is determined in step 230 that the timer has expired, step 260 is executed for exiting the waiting state and performing the second action. In the embodiment illustrated in FIG. 1, the second action may be action B5 "RR connection release" when the timer expires.

In the embodiment illustrated in FIG. 1, the MM layer of the mobile device may enter a specific state corresponding to the specific action after exiting the waiting state. For example, after exiting state 9, the mobile device may perform action B1 and enter state 19, perform action B2 and enter state 6, perform action B3 and enter state 7, perform action B4 and enter state 25, or perform action B5 and enter state 19. After the MM layer exits the waiting state in step 250 or 260, step 270 is then executed for resetting the timer before looping back to step 210.

In the present invention, before the waiting period of the mobility management layer after entering a waiting state expires, the mobile device is configured to passively await further instructions from the network. After the waiting period of the mobility management layer after entering the waiting state expires, the mobile device is configured to control the MM layer to exit the waiting state. If the network somehow fails to respond, the MM layer of the mobile device may exit the waiting state for providing other services, thereby improving system efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing a mobility management layer in a mobile device, comprising:
   the mobility management layer entering a waiting state including establishing a radio resource connection without establishing any mobility management connection;
   acquiring a waiting period after the mobility management layer enters the waiting state;
   the mobility management layer exiting the waiting state according to a command received from a network if the waiting period does not exceed a predetermined value or the mobility management layer exiting the waiting state if the waiting period exceeds the predetermined value;
   determining whether the command associated with exiting the waiting state is received from the network if the waiting period does not exceed the predetermined value; and
   the mobility management layer exiting the waiting state and performing a specific action corresponding to the command when receiving the command,
   wherein the specific action includes an "RR (radio resource) connection release" action, an "indicate MM (mobility management) connection" action, an "MS (mobile station) deactivated and attach allowed" action, or an "RR connection release not allow" action defined in a 3GPP (the 3rd Generation Partnership Project) specification 24.008 rel-11.2.

2. The method of claim 1, wherein the mobile device performs the specific action when receiving the command if the waiting period does not exceed the predetermined value, and the mobility management layer enters a state 3 "location updating initiated", a state 6 "MM connection activated", a state 7 "IMSI (international mobile subscriber identity) detach activated, a state 9 "wait for network command", a state 19 "MM idle", and a state 25 "RR connection release not allow" defined in the 3GPP specification 24.008 rel-11.2.

3. The method of claim 1, wherein the waiting state is a state 9 "wait for network command" defined in the 3GPP specification 24.008 rel-11.2.

4. The method of claim 3, further comprising:
   the mobility management layer exiting the waiting state and releasing a radio resource connection if the waiting period exceeds the predetermined value.

5. The method of claim 1, further comprising:
   the mobility management layer entering the waiting state when receiving a paging from the network.

* * * * *